(12) United States Patent
Boström et al.

(10) Patent No.: US 6,504,840 B1
(45) Date of Patent: Jan. 7, 2003

(54) METHOD, SYSTEM AND APPARATUS FOR TRANSFERRING INFORMATION BETWEEN NODES IN A CIRCUIT SWITCHED TIME DIVISION MULTIPLEXED METHOD

(75) Inventors: Anders Boström, Solna (SE); Christer Bohm, Nacka (SE); Per Lindgren, Stockholm (SE); Elling Disen, Stockholm (SE)

(73) Assignee: Net Insight AB (SE)

( * ) Notice: Subject to any disclaimer, the term of this patent is extended or adjusted under 35 U.S.C. 154(b) by 0 days.

(21) Appl. No.: 09/535,438

(22) Filed: Mar. 23, 2000

(Under 37 CFR 1.47)

Related U.S. Application Data

(63) Continuation-in-part of application No. PCT/SE98/01608, filed on Sep. 10, 1998.

(30) Foreign Application Priority Data

Sep. 24, 1997 (SE) .............................. 97034490
Mar. 23, 1999 (SE) .............................. 99010810

(51) Int. Cl.⁷ .............................. H04L 12/43; H04J 3/16
(52) U.S. Cl. .................. 370/360; 370/450; 370/458; 370/470
(58) Field of Search ................................ 370/348, 357, 370/360, 363, 375, 376, 437, 438, 442, 450, 458, 465, 470, 471, 478, 338, 395, 389, 395.1, 474; 341/102, 106

(56) References Cited

U.S. PATENT DOCUMENTS

| | | | |
|---|---|---|---|
| 5,027,349 A | | 6/1991 | Thorne ........................ 370/85.1 |
| 5,361,261 A | * | 11/1994 | Edem et al. ................. 341/102 |
| 5,602,830 A | * | 2/1997 | Fichou et al. ............... 370/232 |
| 5,930,265 A | * | 7/1999 | Duault et al. ............... 370/473 |
| 6,041,051 A | * | 3/2000 | Doshi et al. ................ 370/352 |
| 6,256,323 B1 | * | 7/2001 | Benayoun et al. ........... 370/474 |

FOREIGN PATENT DOCUMENTS

| | | |
|---|---|---|
| EP | 0397138 A2 | 11/1990 |
| WO | WO 97/20405 | 6/1997 |

OTHER PUBLICATIONS

IEEE STD 802.3 Draft Supplement, CSMA/CD "Access Method and Physical Layer Specification", IEEE Nov. 1989.*

"Worst Deterministic Pattern Allocation", a viable approach to attain statistical gain in ATM, Supercomm/ICC, New Orleans, pp. 106–110, May 1994.*

Bohm, C., "Circuit Switching for High Performance Integrated Services Networks, a PHD dissertation Christer Bohm, Jun. 1996, TRITA–IT R 96:10, ISSN 1103–534X ISRN KTH/IT/R–96/10–SE", pp. 69–73.

Gauffin, L., et al., "Multi-gigabit networking based on DTM," *Computer Networks and ISDN Systems,* vol. 24, No. 2, Apr. 1992, pp. 119–130.

* cited by examiner

*Primary Examiner*—Hassan Kizou
*Assistant Examiner*—Afsar M Qureshi
(74) *Attorney, Agent, or Firm*—Skjerven Morrill LLP

(57) ABSTRACT

The present invention relates to a method, a system and apparatuses for transferring data on a bitstream in a circuit switched time division multiplexed network, wherein said bitstream is divided into frames, each frame is divided into time slots, and said time slots are divided into control slots and data slots, and wherein an isochronous channel, comprising one or more data slots within each cycle of said bitstream, has been established between a first node and a second node of said network. According to the invention, said bitstream is provided with data distinguishing each data slot, within said channel, that contains non-valid data as a result of said first node not being able to transmit valid data into said each data slot.

17 Claims, 7 Drawing Sheets

METHOD, SYSTEM AND APPARATUS FOR TRANSFERRING INFORMATION BETWEEN NODES IN A CIRCUIT SWITCHED TIME DIVISION MULTIPLEXED METHOD

CROSS REFERENCE TO RELATED APPLICATIONS

The present application is a continuation-in-part of International Application No. PCT/SE98/01608 filed Sep. 10, 1998, designating the United States of America incorporated herein by reference.

TECHNICAL FIELD OF INVENTION

The present invention relates to a method, a system and apparatuses for transferring data on a bitstream in a circuit switched time division multiplexed network, wherein said bitstream is divided into frames, each frame is divided into time slots, and said time slots are divided into control slots and data slots, and wherein an isochronous channel, comprising one or more data slots within each cycle of said bitstream, has been established between a first node and a second node of said network.

TECHNICAL BACKGROUND AND PRIOR ART

Today, new types of circuit-switched communication networks are being developed for the transfer of information using isochronous channels carried on time division multiplexed bitstreams, wherein a bitstream is divided into frames, each frame in turn being divided into time slots.

One example of such a network is the so-called DTM network (DTM—Dynamic Synchronous Transfer Mode). DTM is a broadband network architecture (see e.g. Christer Bohm, Per Lindgren, Lars Ramfelt, and Peter Sjödin, The DTM Gigabit Network, Journal of High Speed Networks, 3(2), 109–126, 1994, and Lars Gauffin, Lars Håkansson, and Björn Pehrson, Multi-gigabit networking based on DTM, Computer Networks and ISDN System, 24(2), 119–139, April 1992).

The basic topology of a network of this kind is preferably a bus with two unidirectional optical fibers connecting a number of nodes, each node being arranged to serve one or more end users connected thereto. Note, however, that the topology may just as well be realized by any other kind of structure, e.g. a ring structure or a hub structure.

The bandwidth of each wavelength on the bus, i.e. each bitstream on each fiber, is divided into fixed size, typically 125 µs, frames which in turn are divided into fixed size, typically 64-bit, time slots. The number of slots in a frame thus depends on the network's bit-rate. The slots are divided into two groups, control slots and data slots. Control slots are used for transferring of signaling messages between said nodes for the network's internal operation. The data slots are used for the transfer of user data, also referred to as payload data. The user data is typically transferred between end user having access to said network, either directly or via a node unit providing said end user with access to said network.

Each node is hence arranged to dynamically establish isochronous communication channels, each channel comprising a set of data slots within each frame on a bitstream, for the transfer of data through the network.

When, for example, a first user connected to a first node wants to transfer information to a second user connected to a second node, said first node will allocate a number of data slots within each frame, thus defining an isochronous channel, for the first user to write data into. The first node will also send a control message in a control slot to the second node, instructing said second node to read any data being provided in said allocated data slots within said frame and to send such data so said second user.

SUMMARY OF THE INVENTION

The object of the invention is to provide a faster and more reliable way of handling communication in networks of the above-mentioned type.

This and other objects are accomplished by the invention as defined in the accompanying claims.

Hence, according to a first aspect of the invention, there is provided a method of the kind mentioned in the introduction, said method being characterized by the step of providing said bitstream with data distinguishing each data slot, within said channel, that contains non-valid data as a result of said first node not being able to transmit valid data into said each data slot, which step in turn comprises the steps of:

providing said each data slot with data designating the respective data slot as containing non-valid data;

encoding said designating data of each respective data slot as a specific bit pattern; and transmitting said specific bit pattern on said bitstream, said specific bit pattern, when received, being recognizable as identifying a data slot which contains non-valid data.

According to a second aspect of the invention, there is provided a system for transferring data on a bitstream in a circuit switched time division multiplexed network, wherein said bitstream is divided into frames, each frame is divided into time slots, and said time slots are divided into control slots and data slots, comprising a first node for transmitting data into time slots of said bitstream; a second node for reading data from time slots of said bitstreams; means for establishing an isochronous channel, comprising one or more data slots within each cycle on said bitstream, between said first node and said second node; and means for providing said bitstream with data distinguishing each data slot, within said channel, that contains non-valid data as a result of said first node not being able to transmit valid data into said each data slot.

According to a third and a fourth aspect of the invention, there is provided sending and receiving node apparatuses, which will be further disclosed below.

The invention serves to avoid the situation wherein non-valid data, or "garbage" data, is transferred in the data slots of an allocated isochronous channel on a bitstream between two nodes as a result of the sending node not having received valid data for transmission into said channel, thus possibly resulting in the receiving node reading data from said data slots and passing it along, for example to a receiving end user, irrespective of whether or not said data slots provide valid or non-valid data, consequently making it necessary for the receiving user to distinguish valid data from non-valid data.

According to the invention, the occurrence of this type of undesired situation is prevented by the detection of the failure at the sending node to transmit data for any one of the allocated data slots and by the sending of information to the receiving node as to which data slots within said channel that contain non-valid data (or which data slots that contain valid data). Consequently, it is possible for the receiving node to handle received data accordingly, for example by only passing on valid data to a receiving end user connected to the receiving node.

In this context, it is important to note that, in a conventional network of the kind mentioned in the introduction, the nodes are not concerned with the actual information being transferred on the data slots defining said channel. The sending node merely receives data, for example from a sending end user being served by the sending node, or from another bitstream accessed by the sending node (i.e. in case of the sending node acting as a switch node), and writes said data into data slots of the channel on the bitstream between the sending and the receiving node. Correspondingly, the receiving node merely reads data from said allocated data slots and passes said read data to, for example, a receiving end user connected to the second node, or forwards said data to another bitstream accessed by the sending node (i.e. in case of the receiving node acting as switch node). In other words, with the exemption of the initial channel establishment signaling between the nodes and the mere passing of data to and from data slots allocated to the channel, the first and second nodes are basically not concerned with any control signaling or the like taking place between the communicating end users within the realms of the data slots allocated to said channel, It may hence be said that the nodes are not concerned with the content of data transferred between end users using said allocated time slots. Furthermore, data transferred in said allocated data slots from one end user to another end user may comprise control signaling or control information as well as mere data. However, the node of the network are essentially not concerned with the communication protocol at end user level. Consequently, the communication protocol at the end user level need not be synchronous, but may just as well be a synchronous or the like. Hence, any kind of information transferred in said allocated data slots is regarded as user data as far as the sending and receiving nodes are concerned.

According to the invention, the nodes are still not concerned with the actual content of any data sent in the data slots of the allocated channel. However, the sending node will make sure to distinguish any data slot of the channel that will not contain valid data, for example that will not be provided with data due to the failure on behalf of a sending end user connected to the sending node to provide data to the sending node for transmission into said channel.

The transmission of non-valid data distinguishing information according to the invention takes place outside of the protocol used between end users at the end user level. Hence, the scheme suggested according to the invention may be said to define a protocol at node level and is hence transparent as far as the end users are concerned.

Further, according to the invention, the step of distinguishing one or more specific data slots within the channel as containing non-valid data does not affect the allocation of the channel. Said slots remain allocated to the channel and are hence used by the sending user again during the next frame of the bitstream.

Also, note that the term "data distinguishing each data slot, within said channel, that contains non-valid data" (also referred to as "validity data") according to the invention may identify either data slots containing valid-data or data slots containing non-valid data, or both, as long as the receiving node is able to separate data slots transferring valid data from data slots transferring non-valid data. Hence, the whether or not said distinguishing data actually designates data slots containing valid data or data slots containing non-valid data will depend upon the chosen implementation.

There may be many different reasons as to why the sending node will lack valid data to transmit into a data slot of the allocated channel. For example, the communication protocol used end to end between a sending end user and the receiving end user may simply state that there should not be any transfer of data in time intervals corresponding to the missing data. The end users may for example communicate using a packet-based protocol with some slots corresponding to gaps between packets. Another reason may be that a sending end user fails to provide the sending node with valid data because of temporary processing or communication capacity shortage, either within the sending end user itself or in relation to the communication between the sending end user and the sending node, for example at a packet switched node situated between the end user and the sending node.

As understood, a sending and receiving node, or a "first" and "second" node, according to the invention, need not necessarily be the terminating points of the communication path between the sending end user and the receiving end user, but may merely define a portion of said communication path. This will especially be the case when a multi-hop channel has been established via said first and second nodes.

Furthermore, if said first node is a switch node, merely switching said channel from data slots defining the channel on a first bitstream to data slots defining the channel on a second bitstream, said data distinguishing a data slot as transferring non-valid data may in fact be received from said first bitstream and may then simply be mapped by the first node from the first bitstream to the second bitstream. Correspondingly, if said second node is a switch node, merely switching said channel from data slots defining the channel on a first bitstream to data slots defining the channel on a second bitstream, said data distinguishing a data slot as transferring non-valid data need not be evaluated and/or used to discard data at the second node, but may instead simply be mapped by the second node from the first bitstream to the second bitstream, thereby similarly informing a receiving node attached downstream on the second bitstream as to the validity of data provided in the data slots defining the channel on the second bitstream.

According to a preferred embodiment of the invention, the node serving a sending end user is provided with means for detecting that the sending end user has failed to provide valid data for any one of the time slots of the allocated channel. Said node may then use one of several schemes for providing information to the node(s) serving the receiving user(s) that certain specific time slots of the channel contain non-valid data. According to the invention, the sending node simply writes data designating the respective data slot as containing non-valid data into each slot within the channel that does not contain valid data and then encodes that data as a specific bit-pattern. For example, a bit-pattern marking said slot as "idle" may be used. Correspondingly, a node serving a receiving end user may distinguish said data slots containing non-valid data by detecting said bit-pattern marking the respective slot as "idle", or the like. Any data provided in such non-valid data marked data slots may then simply be discarded at the receiving node, and will hence not be passed on to the receiving end user.

According to another embodiment of the invention, a data slot, which contains N bits of data, and which has been provided with data designating the data slot as containing non-valid data, is encoded into M bits of data. Thereby, spear bites are generated, which can be used for completing the specific bit-pattern, which alerts a receiving node that the data slot contains non-valid data. Preferably, N=64 and M=80 as will be further discussed below.

According to an embodiment of the invention, a third node, arranged upstream in relation to the first node, will provide said bitstream with data designating all data slots within said channel as containing non-valid data. Said first (sending) node is then arranged to invalidate said data designating all data slots within said channel as containing non-valid data. Thus, if the sending node lacks data to transmit into a data slot of the channel, the sending node merely leaves the designating data already provided by said third node unchanged for that specific time slot.

As a result of the marking of nonsense slots as containing non-valid data according to the invention, it is possible to let a valid-data slot and a non-valid data slot change slot positions with each other within a given channel as long as the sequential order of the valid data slots are not altered. Hence, it is possible for the sending node to send valid data slots together in a contiguous slot range and to send non-valid data slots together in another contiguous slot rango within said given channel, which further improve the communication capabilities.

An important part of the invention according to one embodiment thereof is the detection aat the sending node that data has not been delivered for a specific data slot since the last frame. This is the signal that, for example, an idle slot, or the like, should be sent instead. Since a channel consists of a set of data slots in the frame (a time slot is identified by the slot number in the cycle) that are allocated to the channel at channel set-up, after channel set-up, data is sent cyclically in each data slot that is allocated to the channel. This means that, for a specific data slot, data has to be delivered cyclically, i.e., data has to be delivered to the sending node within one frame time.

One way to keep record of this is to use a "written-slot" record. This record has typically one entry for each time slot in the frame. The written-slot record is essentially a set of flags (one for each time slot is in the frame) telling whether new data has been delivered for that time slot since it was last sent onto the link. The corresponding entry for a time slot is typically set when data has been delivered (from and end user interface or from another port in a switch) since the last time that specific slot was sent onto the medium. Correspondingly, the entry is cleared when data is written onto the medium, i.e., when the slot with the slot number in the cycle that corresponds to the entry of the written-slot record passes.

When data is to be written onto the medium, the node checks it's written-slot record, and if said entry is set writes into the corresponding data slot from the corresponding buffer. However, if the entry is cleared, no data has been delivered since last frame and thus an idle slot or the like is generated.

Another implementation can be used if per-channel queues are used, i.e., a queue where data is placed in the order it is to be sent. If there is no data in the queue when data is to be sent onto a specific time slot, and idle slot or the like is sent instead. When a FIFO is used, the data delivered to the node needs to be tagged with a channel identifier or a slot number, if several channels are supported by the node. If only a single channel is supported, it is enough to check whether the FIFO is empty or not when data is to be sent. If it is empty, and idle slot is sent instead. If several channels are supported, the node must be able to decide whether the first data item in the FIFO should be sent onto the passing slot. This could be implemented by tagging the data in the data in the FIFO with a channel identifier or with the slot number it should be sent onto. If slot numbers are used and no reordering is assumed, the tagged slot number is compared with a slot counter of the node. If equal, the data slot is sent, otherwise an idle slot is sent. If a channel identifier is tagged to the data in the FIFO, a channel table is needed that knows for each outgoing slot what channel the data slot stems from. If that channel corresponds to the tagged channel identifier in the FIFO, the data slot is sent otherwise an idle slot is sent.

It is understood that the sending of information from said first user/node to said second user/node according to the invention may be either point—to—point, multi-cast or broad-cast.

Also, it is understood that a channel according to the invention is said to be isochronous in that it is defined by a set of slots, said set of slots occurring cyclically at fixed intervals on said bitstream.

Further, aspects, objects and features of the invention will be understood more fully from the accompanying claims and from the following description of exemplifying embodiments thereof with reference to the accompanying drawing.

BRIEF DESCRIPTION OF THE DRAWINGS

Exemplifying embodiments of the invention will now be described with reference to the accompanying drawings, wherein:

FIG. 6b schematically shows the bit pattern of the validity control slot in FIG. 6a;

DETAILED DESCRIPTION OF PREFERRED EMBODIMENTS

Figure 1:
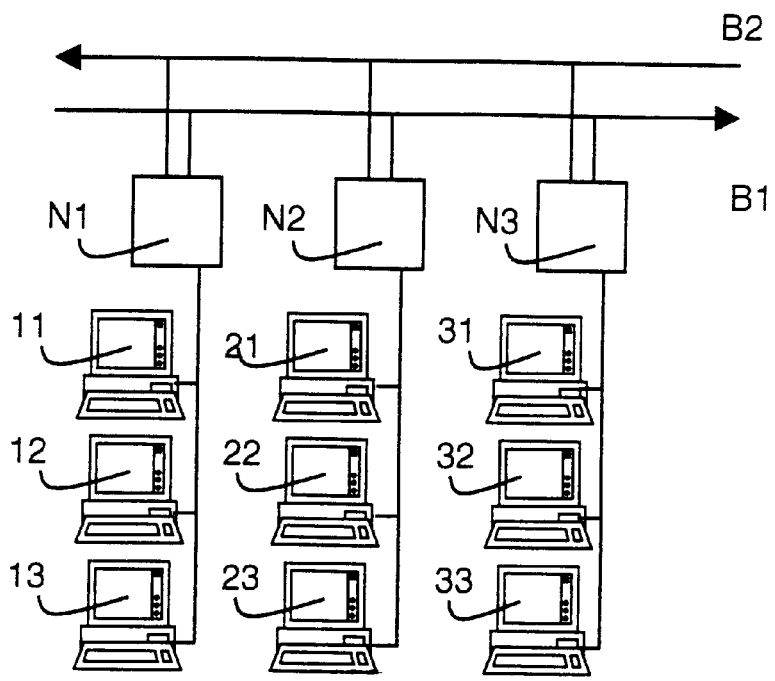
FIG. 1 schematically shows a network of the kind addressed by the invention.

In FIG. 1, the basic topology of a circuit switch time multiplexed network of the kind addressed by the invention is shown. The network in FIG. 1 comprises three nodes N1, N2, and N3, each connected to a link comprising two busses carrying bitstreams B1 and B2. The bitstream B1 is used for communication in one direction along the link, and the bitstream B2 is used for communication in the other direction along the link. Even though a simple two-way structure is shown in FIG. 1, a ring structure or a hub structure or the like may also be used. Also, two or more busses (or for that matter two or more single fibers) may be interconnected using switch nodes, thereby creating a network having the structure of a two-dimensional or three dimensional mesh. As will be described below, the communication on bitstreams B1 and B2 is synchronous and time multiplexed. In addition, wavelength division multiplexing, i.e. using fibers carrying more than one bitstream using different wavelengths, may be used to increase the network capacity.

In FIG. 1, each node is arranged to serve one or more end users by providing access to the bitstreams B1 and B2. Hence, three end users 11, 12, and 13 are connected to the first nodes N1, three end users 21, 22, and 23 are connected to the second node N2, and three end users 31, 32, and 33 are connected to the third node N3. When, for example, the end user 21 connected to the second node N2 wants to send information to the end user 32 connected to the third node N3, the nodes N2 and N3 will establish a communication channel on bitstream B1. The second node N2 will then transfer data from the sending end user 21 to the bitstream on bitstream B1, and the third node N3 will in turn transfer said data from bitstream B1 to the receiving end user 32. If information is to be passed from the end user 32 to the end user 21 as well, a similar channel is set up on bitstream B2. Even though the end users have been shown as computers or similar work stations in FIG. 1, it is understood that the end user may be any type of electronic equipment needing access to the network, such as printers, servers, facsimile machines, telephones, television sets, radio receivers, and the like.

Figure 2:
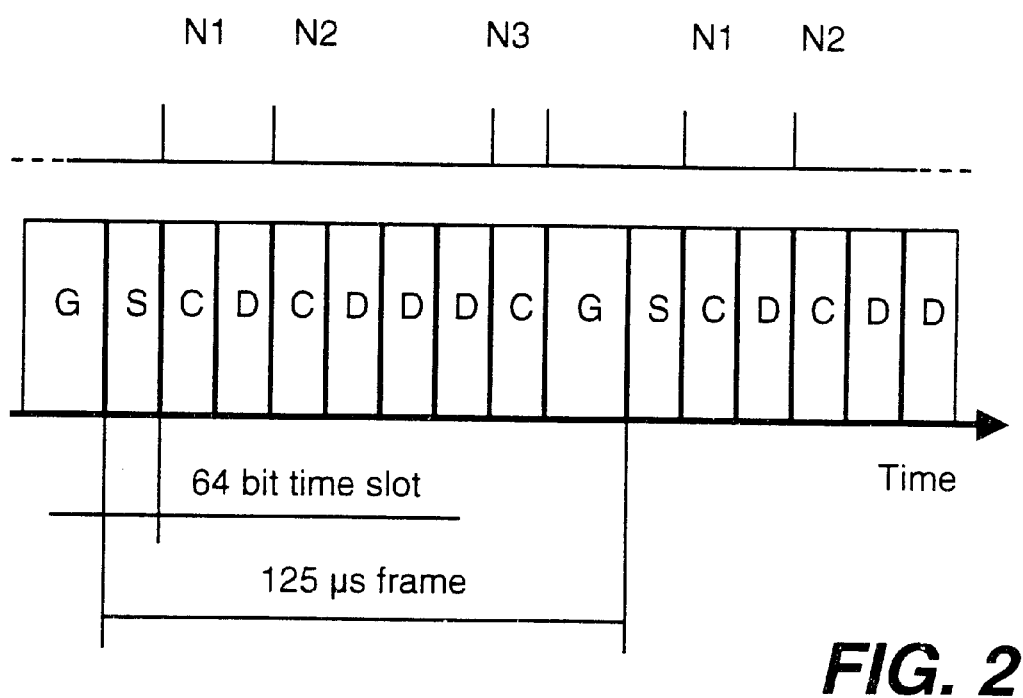
FIG. 2 schematically shows an exemplifying structure of the bitstreams shown in FIG. 1.

The structure of the bitstream B1 shown in FIG. 1 will now be described with reference to FIG. 2. The bitstream B1 is divided into 125 μs frames. Each frame is in turn divided into 64 bit time slots. The number of time slots within a frame thus depends on the network's bit rate. As is understood, the number of time slots shown in the bitstream frame shown in FIG. 2 is merely illustrative, the actual number of slots within each frame typically being far greater than what is shown in FIG. 2. As will be described in more detail in the following with reference to FIG. 13, each 64 bit time slot is transmitted encoded into an 80 bit word.

The time slots are generally divided into two groups, control slots C and data slots D. The control slots C are used for control signaling between the nodes of the network, i.e., for carrying messages between nodes for the internal operation of the network, such as for channel establishment, slot allocation, and the like. The data slots D are used for the transfer of user data, also referred to as "payload data", between end users connected to said nodes.

In addition to said control slots and data slots, each frame comprises one or more synchronization slots S used to synchronize the operation of each node in relation to each frame. Also, to make sure that the number of slots in a frame will not overlap a following cycle, a guard band G is added after the last slot at the end of each frame. As indicated in FIG. 2, the bitstream frame is repeated continuously.

Each node has access to at least one control slot C and to a dynamic number of data slots D within each frame. Each node uses its control slots C to communicate with other nodes within the network. The number of data slots D allocated to each node depends upon the transfer capacity requested by the end users served by the respective node. If the end users of a certain node require a large transfer capacity, the node will allocate more data slots for that purpose. On the other hand, if the end users of a certain node merely require a small transfer capacity, the node may limit the number of data slots allocated for that purpose. Also, the number of control slots allocated to each node may be increased or decreased depending on the node's demand for signaling capacity. Hence, the allocated of both time slots and data slots to difference nodes may be dynamically adjusted as the network load changes.

In FIG. 2, the first node N1 has access to one control slot and one data slot. The second node N2 has access to one control slot and three data slots, as a results of its end users currently having a greater need to send data. The third node N3 merely has access to one control slot and no data slots as a result of its users temporarily having no need for sending data via the network.

In FIGS. 3, 4, 5, 6a, 6b, 7a, and 7b, an isochronous, circuit switched communication channel A is shown. For ease of description, it will be assumed in the following that the channel A, being defined by the data slots 5 to 10 of each frame, has been established between nodes N2 and N3 in FIG. 1 as a result of the end user 21 wanting to send information to the end user 32. Hence, the purpose of the channel A is to transfer user data from the sending end user 21 via the sending node N2 and the receiving node N3 to the receiving end user 32.

Figure 3:
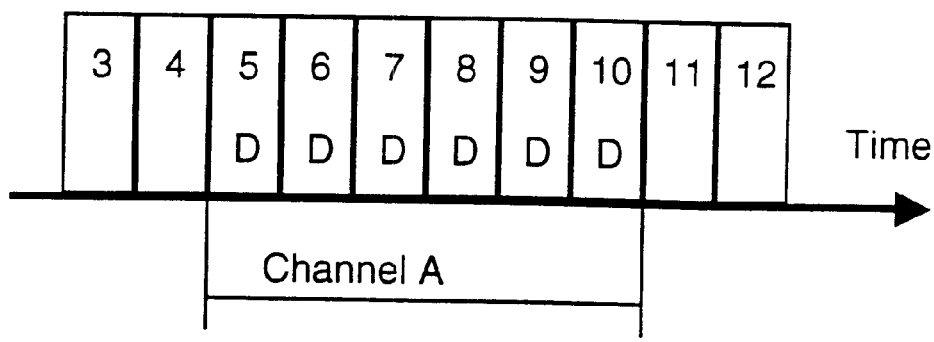
FIG. 3 schematically shows an isochronous data channel established on a bitstream of the kind shown in FIG. 2.

FIG. 3 shows the structure of the bitstream in a situation when the sending end user 21 has provided node N2 with a 64 bit data block for each of the slots of the allocated channel A. Thus, every data slot within the channel A carries valid data, which will consequently be read by node N3 and transferred to the end user 32.

Figure 4:
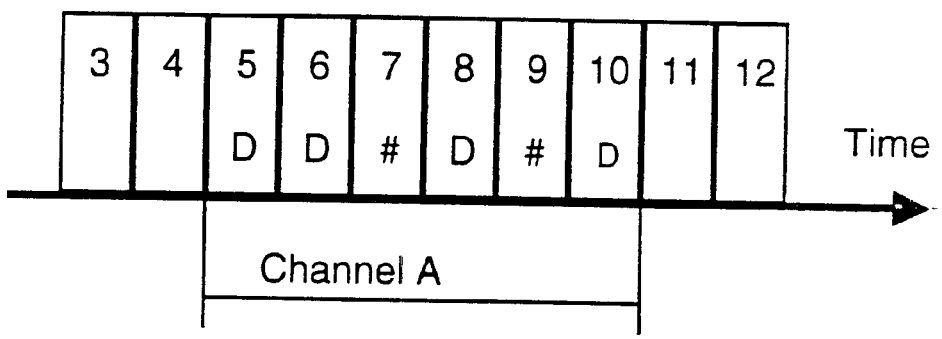
FIG. 4 schematically shows the bitstream of FIG. 3 when an end-user has failed to provide valid data to a sending node.

FIG. 4 shows the structure of the bitstream in a situation when the sending end user 21 has failed to provide node N2 with valid 64 bit data blocks for the data slots 7 and 9 within the allocated channel A, these "nonsense" data blocks 7 and 9 thus being designated with the character # in FIG. 4. Thus, in FIG. 4, not every data slot within the channel A carries valid data in this frame. However, since a node according to prior art is not concerned with the contents of the data slots within the data channel A, it will still read every data slot and transfer the content of each data slot, including the nonsense data of slots 7 and 9, to the end user 32, thus leaving it up to the end user to distinguish and separate valid data from nonsense data.

Figure 5:
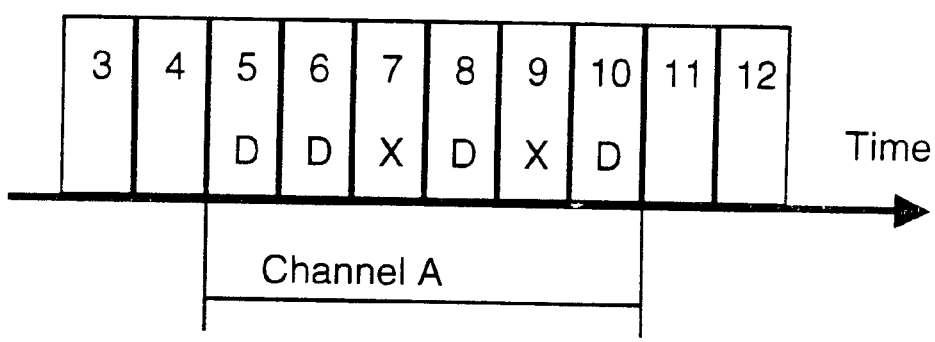
FIG. 5 schematically shows the bitstream of FIG. 4 modified according to another embodiment of the invention.

FIG. 5 shows the structure of the bitstream of FIG. 4 having been modified according to an embodiment of the invention. According to the invention, the sending node N2 will detect that the sending end user has failed to provide valid data for slots 7 and 9, for example by the node N2 recognizing that it has not received any data at all for these two slots from the sending end user 21, or by the sending end user 21 transmitting control information to the node N2 stating that there is no valid data for slots 7 and 9. Upon detecting that there does not exist any valid data for slots 7 and 9, the node N2 will provide each of the slots 7 and 9 with data designating that the respective slot contains non-valid data. According to the example shown in FIG. 5, this is performed by the sending node N2 writing so called idle data blocks X into the respective slots 7 and 9, which will be described more in detail with reference to FIG. 8. Before transmitting the slots 7 and 9 onto the bitstream, they are encoded into a specific bit-pattern, which identifies the slots as containing idle data. This encoding operation will be further explained below.

When reading the bitstream of FIG. 5, the receiving node N3 will detect the specific bit pattern, thereby recognizing slots 7 and 9 as containing idle data blocks X, and will thus distinguish the data slots containing valid data from the data slots containing non-valid data, as will be described more in detail with reference to FIG. 10. As a result, node N3 will only transfer the valid data blocks provided in the data slots 5, 6, 8, and 10 to the receiving end user 32 and hence not transfer data contained in the blocks 7 and 9. Thus, the end user 32 is only provided with valid data and does not need to have the ability to distinguish and separate valid data blocks from non-valid data blocks.

A modification of the bitstream of FIG. 4 according to another embodiment of the invention will now be described with reference to FIG. 6a and 6b. As in FIG. 5, the sending node N2 will detect that the sending end user 21 has failed to provide valid data for slots 7 and 9. However, in the embodiment shown in FIG. 6a, upon detecting that there does not exist any valid data for slots 7 and 9, node N2 will provide a so called validity control slot 3 with a bit pattern P, shown in detail in FIG. 6b, indicating which slots within the channel A that contains non-valid data, as will be described further with reference to FIG. 9. As shown in FIG. 6b, the bit pattern P contains zeros in bit positions that corresponds to slots within the frame that, as far as node N2 is aware, contains non-valid data. More important, the bit pattern P contains ones in bit positions that corresponds to slots within the frame that, as far as node N2 is aware, contains non-valid data.

Figure 6A:
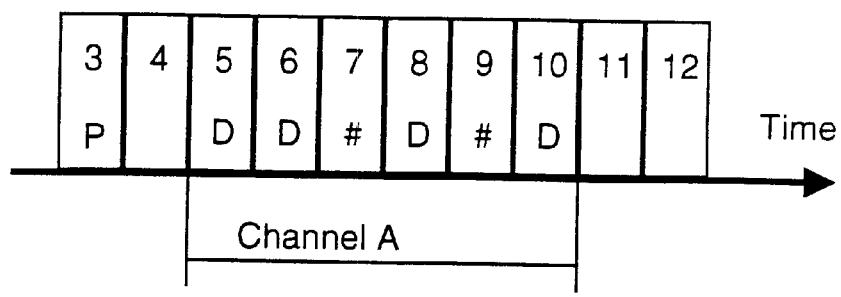
FIG. 6a schematically shows the bitstream of FIG. 4 modified according to another embodiment of the invention.
Figure 6B:
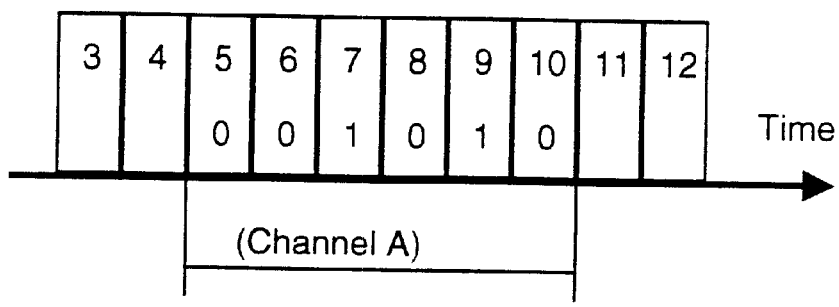

When reading the bitstream of FIG. 6a, the receiving node N3 will evaluate the bit pattern P of the validity slot 3. By detecting any bit positions, corresponding to data slot positions within the channel A, that contains ones, the receiving node N3 will know which data slots in the channel A that contain valid data and which don't, as will be described more in detail with reference to FIG. 11. As a result, node N3 will only transfer data provided in the valid data slots 5, 6, 8, and 10 to the receiving end user 32 and will hence ignore data contained in data slots 7 and 9.

Figure 7A:
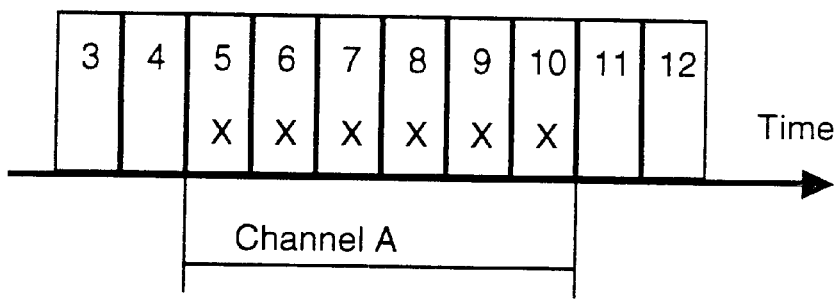
FIGS. 7a and 7b schematically shows an initial and a modified bitstream, respectively, according to yet another embodiment of the invention.
Figure 7B:
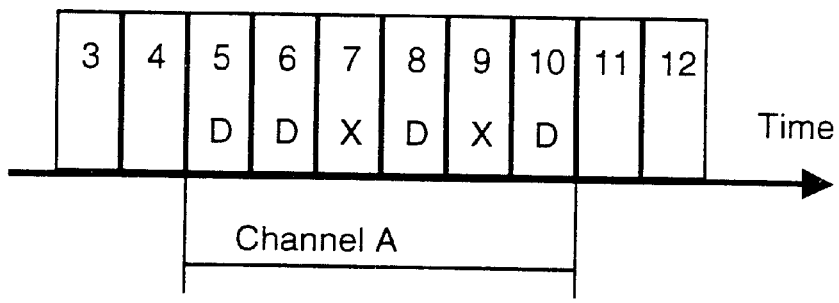

Modification of the bitstream according to another embodiment of the invention will now be described with reference to FIGS. 7a and 7b. FIGS. 7a and 7b show the situation when a node arranged upstream on bitstream B1 in relation to the sending node N2, such as node N1 in FIG. 1, which for example may be a master node or a synchronizing node, initially, by default, provides essentially all slots within the frame, or at least all slots within the channel A, with exemption for synchronizing slots and the like, with idle blocks designating that each respective one of said slots contains non-valid data. Hence, when reaching the sending node N2, all time slots of the channel A on bitstream B1 will already contain idle blocks designating then as containing non-valid data, as shown in FIG. 7a.

In this situation, upon detecting that there does not exist any valid data for slots 7 and 9, node N2 merely writes existing valid data into the respective slots 5, 6, 8, and 10, making sure not to overwrite the already provided idle data blocks in slots 7 and 9, resulting in a bitstream of the kind shown in FIG. 7b. Thus, when reading the bitstream of FIG. 7b, the receiving node N3 will merely act the same way as has been described with reference to FIG. 5 above.

Of course, this kind of mechanism may also be used based upon the provision and evaluation of a validity control slot of the kind discussed with reference to FIGS. 6a and 6b.

For ease of description, it will be assumed in the following FIGS. 8, 9, 10, and 11 that a channel A, being defined by data slots 5 and 6 in each frame of bitstream B1, has been established between nodes N2 and N3 in FIG. 1 as a result of the end user 21 wanting to send information to the end user 32.

Figure 8:
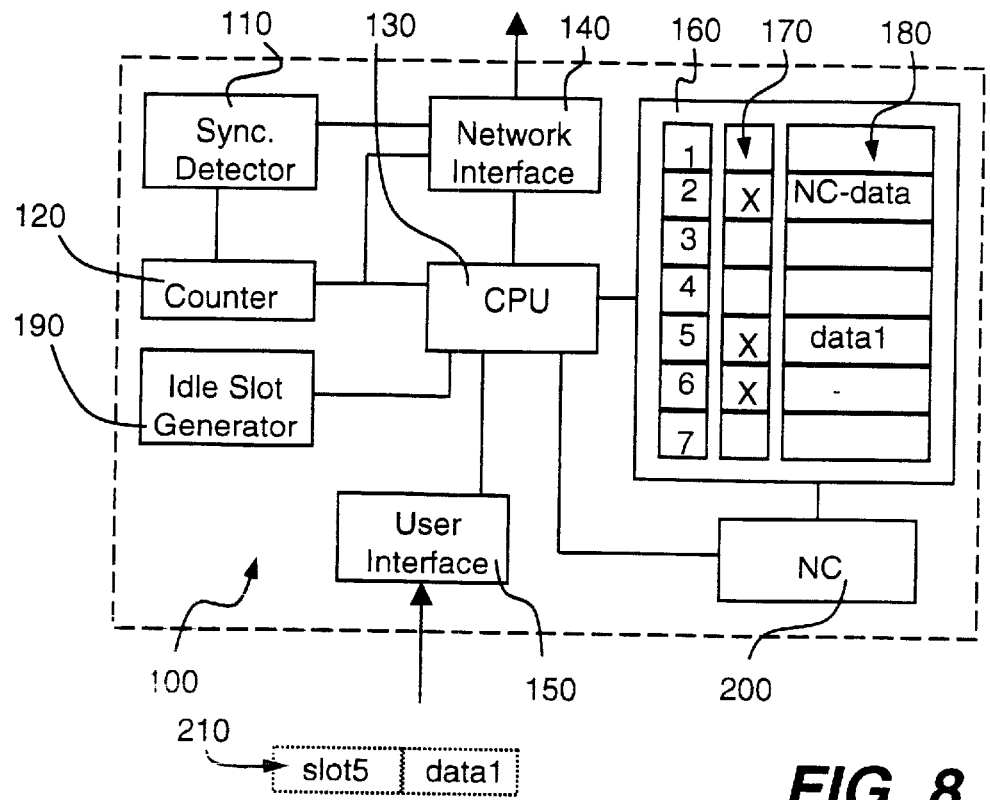
FIG. 8 schematically shows a block diagram of a sending node according to an embodiment of an apparatus according to the invention.

Embodiments of a sending and a receiving node apparatus according to the invention, which in this example is provided at nodes N2 and N3 in FIG. 1, will now be described with reference to FIGS. 8 and 9, respectively. In FIG. 8, a sending node apparatus 100 comprises a synchronization detector 110, a time slot counter 120, a processor 130, a network interface 140, an end user interface 150, a RAM 160 comprising a write access table 170 and a slot data table 180, an idle slot generator 190 and a node controller 200.

In FIG. 8, the synchronization detector 110 will detect a frame synchronization signal (designated S in FIG. 2) on the bitstream B1 passing accessed by the node apparatus 100 via the network interface 140. Based thereupon, the synchronization detector 110 will restart the time slot counter 120. The counter 120 will count the time slot positions passing on bitstream B1 at a predefined bit rate (or at a bit rate generated by a PLL (not shown) locked to the bit-rate received on bitstream B1 via the network interface 140), and will provide a corresponding signal to the processor 130 and to the network interface 140. The processor 130 uses the signal from the counter 120 to keep track on which time slot position within the frame that is currently being processed, and the network interface 140 uses the signal from the counter to synchronize the writing of 64 bit data blocks into slots of the passing bitstream B1.

The node controller 200 will keep track of all required information as to the allocation of slots to different nodes and to different channels. Hence, the node controller 200 is for example used when establishing new channels on behalf of the end users connected to the user interface 150. In FIG. 8, the node controller has specified in the write access table 170 of memory 160 that the node apparatus 100 may write into slots 2, 5 and 6 (marked X in the array) of each frame. The slot 2 is to be used for control signaling to other nodes and the slots 5 and 6 are to be used for the channel A established between the sending end user 21 connected to the node and the receiving end user 32 connected to some other node.

The user interface 150 is connected to the end users attached to the node apparatus 100, i.e. the end users 21, 22, and 23 in FIG. 1. In FIG. 8, the sending end user 21 (not shown) has sent a data packet 210 to the user interface 150. The packet 210 comprises the 64-bit data block (data1) to be sent to the receiver and can identification of the relevant time slot (slot5).

The data block (data1) of the data packet 210 is provided to the corresponding (fifth) data element of the data table 180 of the memory 160 (corresponding to the fifth time slot) in accordance with said slot identification (slot5). At the time of the writing of the fifth time slot in the following frame, as counted by the counter 120, the data block (data1) of the fifth element of the data table 180 will be read out from the memory 160 by the processor 130 and transmitted via the network interface 140 into the correct time slot in the passing bitstream.

It is now assumed that the sending end user 21 has failed to provide the node with a data block corresponding to slot 6 of the current frame. Hence, at the time of the writing of the sixth time slot in the frame, there does not exist any valid data for that time slot. When detecting that data should be written into the sixth time slot, as stated by the X in the sixth element of the write access table 170, and that no valid data exist for that time slot, which is illustrated with a dash mark in the sixth element of the data table 180, the processor 130 will write an idle slot 64 bit data block generated by the idle slot generator 190 via the network interface 140 into the sixth time slot of the passing bitstream. Thus, no nonsense data will be present in time slots 5 and 6. Instead, the time slots 5 and 6 will contain either valid data (data1) or data (idle) clearly designating the respective slot as containing non-valid data. The embodiment of FIGS. 8 and 9 hence correspond to the features described with reference to FIG. 5 above.

Figure 13:
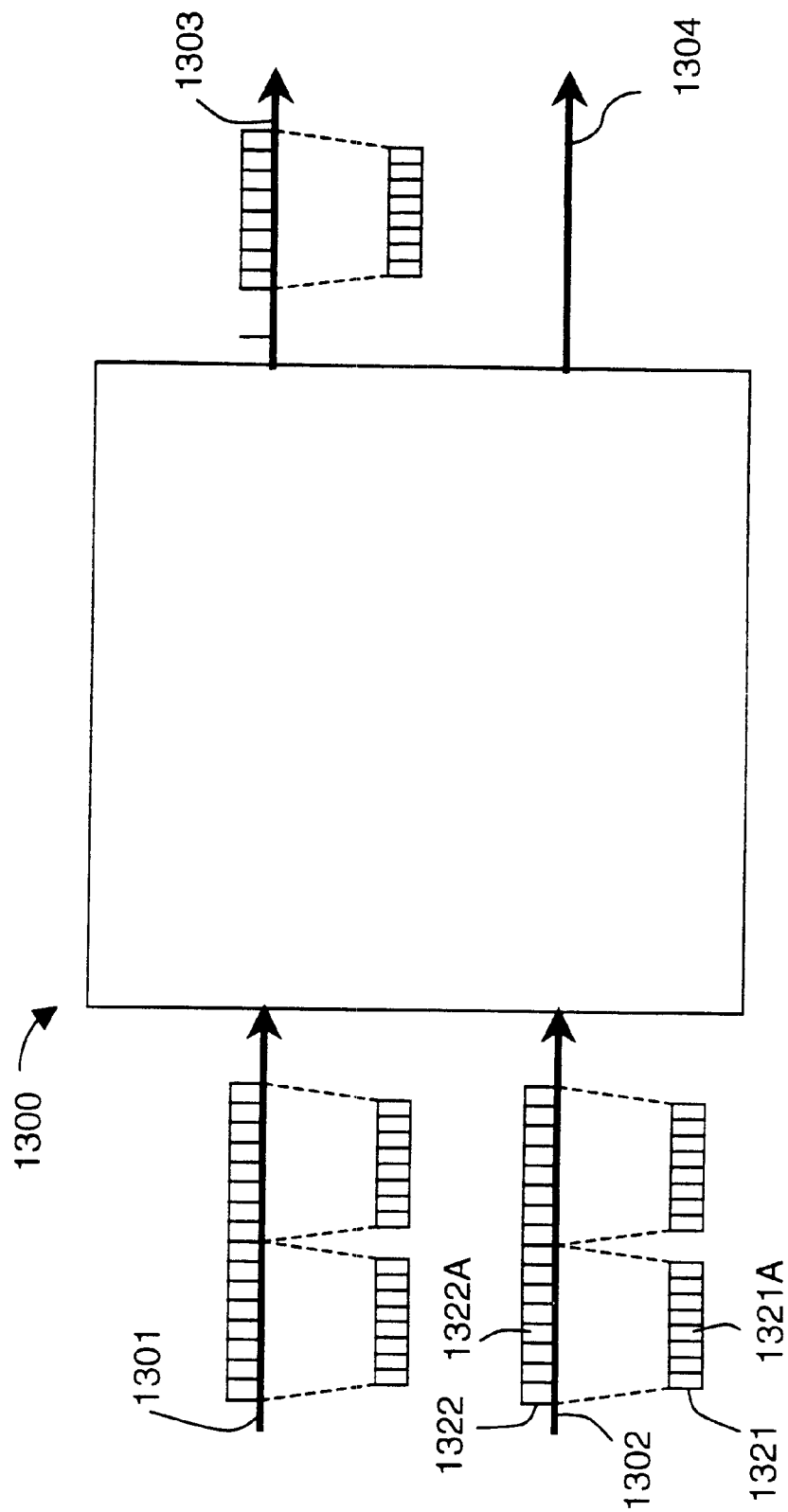
FIG. 13 schematically shows encoding of slots according to an embodiment of the invention.

More particularly, each one of the time slots 5 and 6 are sent in an encoded fashion, as is schematically illustration in FIG. 13. Four bitstreams 1301–1304 are connected to a node 1300. Each time slot 1321 contains 64 bits of data. These are encoded into 80 bits, which are then sent on the bitstream. As shown in FIG. 13 each octet 1321A of data, that is each set of 8 bits, of said 64 bits, is encoded so as to be represented by a new set of 10 bits 1322A. This operation is here referred to as 8B/10B encoding. When a data slot is to be designated as valid or non-valid a corresponding code word of 80 bits is chosen, representing the valid slot data or a non-valid state. When received at the node 1300, each 80 bit code word is decoded and the original 64 bit slot is recreated. In conjunction with the decoding operation it is determined whether the slot contains valid or non-valid data, such as an idle data block as in the above example.

Figure 9:
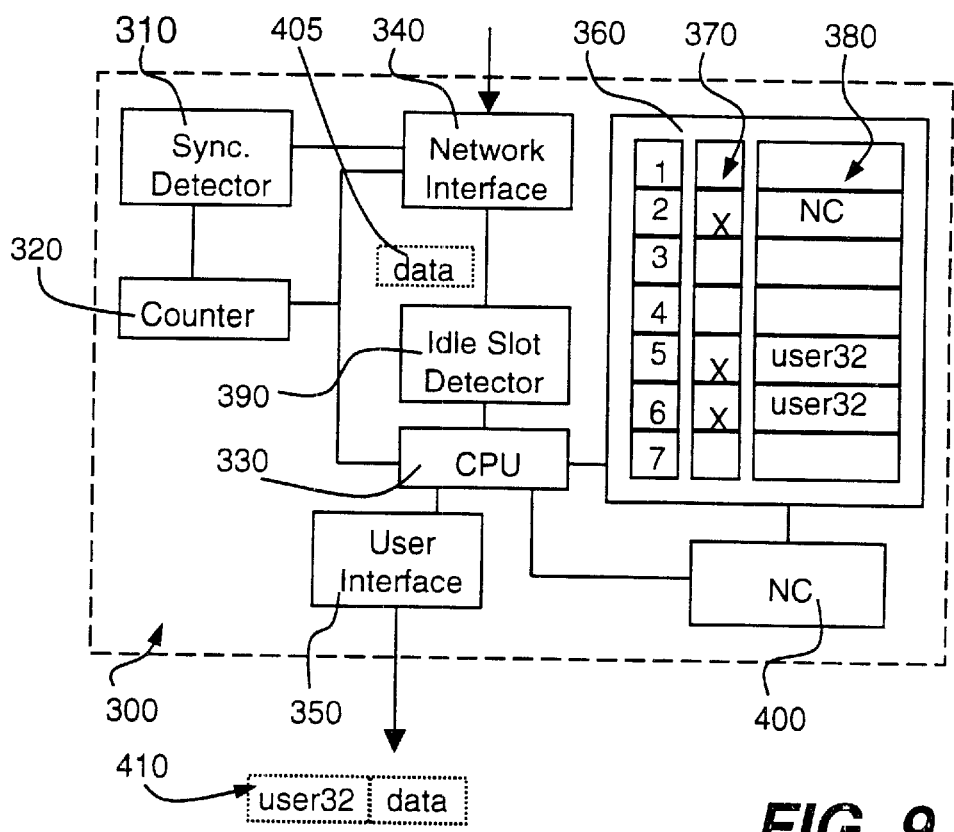
FIG. 9 schematically shows a block diagram of a receiving node according to another embodiment of an apparatus according to the invention.

In FIG. 9, a corresponding receiving node apparatus 300 comprises a synchronization detector 310, a time slot counter 320, a processor 330, a network interface 340, an end user interface 350, a RAM 360 comprising a read table 370 and an end user address table 380, an idle slot detector 390, and a node controller 400. The end user interface 350 is connected to the end users attached to the node apparatus 300, i.e. the end users 31, 32, and 33 in FIG. 1.

In FIG. 9, the operation of the synchronization detector 310, the slot counter 320, and the node controller 400 is similar to that described above with reference to FIG. 8, and further description thereof is therefore omitted.

In FIG. 9, the node controller 400 has specified in the read table 370 of memory 360 that the node apparatus 300 shall read from slots 2, 5 and 6 (marked X in said table). Furthermore, the node controller 400 has specified in the address table 380 that the information received in slot 2 shall be forwarded to the node controller itself and that information received in slots 5 and 6 shall be forwarded to end user 32. Consequently, slot 2 is a control slot to be used for receiving control signaling from other nodes and the slots 5 and 6 are data slots to be used for the established channel A.

When receiving data 405 associated with one of the time slots 2, 4 or 5 marked X in the read table 370, the idle slot detector 390 will determine whether or not the read data is non-valid. If the read data is non-valid, i.e. if the received data 405 contains an idle data block, as has been discussed above, the data is simply ignored and hence not passed on to end users connected to the user interface 350.

If, however, the received data 405 does not contain an idle data block, the data 405 is accepted as valid data and the corresponding entry of the address table 380 is accessed in order to find the end user for which the data 405 is intended. If, for example, the data 405 was read out from slot 5, the address table 380 will state that the data shall be sent to the end user 32, and hence the user interface 350 will send a data packet 410 comprising the data 405 and an end user identification (user32) to the end user 32.

Alternative embodiments of a sending and a receiving node apparatus according to the invention will now be described with reference to FIG. 10 and 11, respectively. In these embodiments, the use of an idle slot generator, as has been described above with reference to FIG. 8, is replaced by the use of validity tables 185 and 385 of memories 160 and 360, respectively. With this exemption, the node apparatuses shown in FIGS. 10 and 11 comprises same or similar parts as the node apparatuses described with reference to FIGS. 8 and 9, and further description thereof is therefore omitted.

Figure 10:
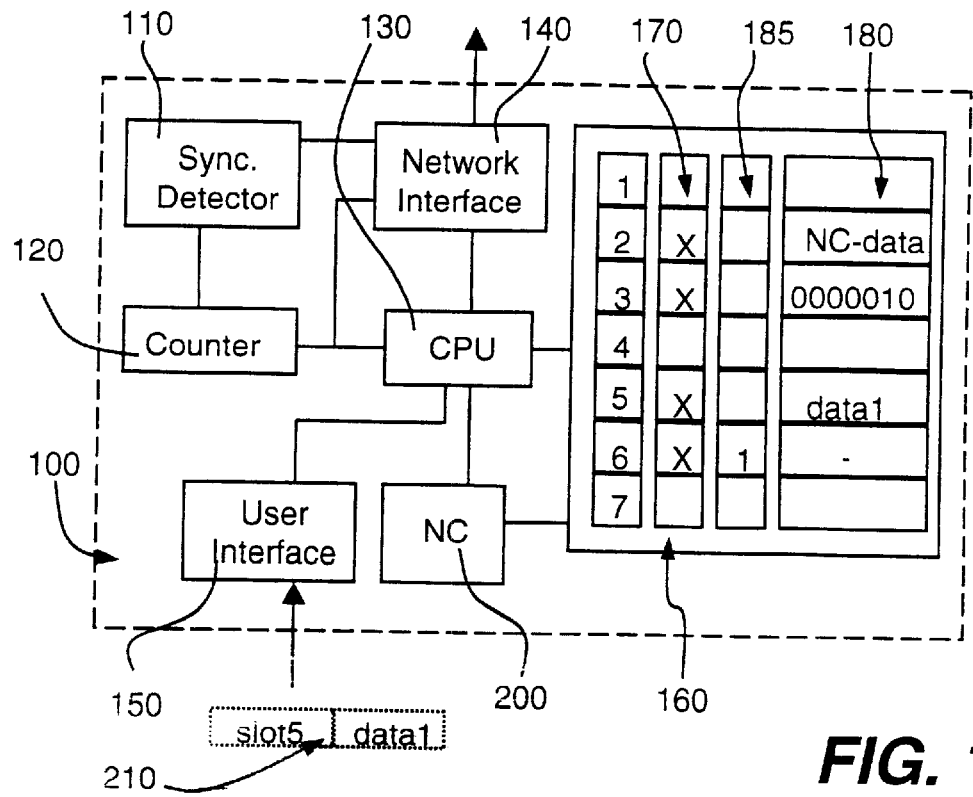
FIG. 10 schematically shows a block diagram of a sending node according to another embodiment of an apparatus according to the invention.

In FIG. 10, the node controller 200 has specified in the write access array 170 of memory 160 that the node apparatus 100 may write into slots 2, 3, 5, and 6 (marked X in the array). The slot 2 is to be used for control signaling to other nodes, the slot 3 is to be used for the sending of a validity bit pattern as discussed above with reference to FIG. 6a and 6b, and the slots 5 and 6 are to be used for the channel A established between the sending end user 21 connected to the node and the receiving end user 32 connected to some other node.

In FIG. 10, at the beginning of a frame, the processor 130 recognizes that the sending end user 21 has merely provided valid data (data1) for the fifth slot but not for the sixth slot of the cycle, as is indicated by the dash mark in the sixth element of the data table 180. The processor therefore marks the sixth element of the validity array 185 with a one (1), said one designating non-valid data, and creates a validity bit pattern based upon all the entries in the validity array. This validity bit pattern (0000010. . . ) is then written into the third entry of the data table 180 corresponding to the validity control slot.

As the processor then writes the data corresponding to slots 2, 3, 5, and 6 into the bitstream via the network interface 140 at time intervals synchronized by the time slot counter 120, the validity control slot 3 will be provided with the validity bit pattern (0000010. . . ) and may thus be used by the receiving node to distinguish valid data from non-valid data.

Figure 11:
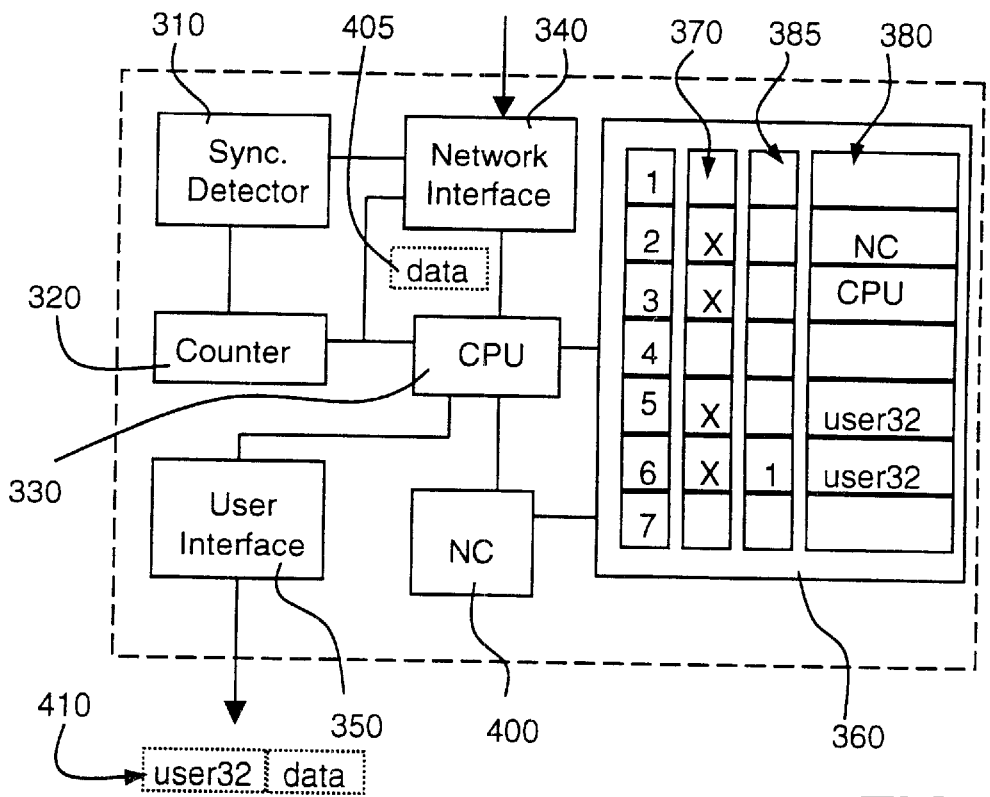
FIG. 11 schematically shows a block diagram of a receiving node according to another embodiment of an apparatus according to the invention.

In the embodiment of a corresponding receiving node apparatus shown in FIG. 11, the node controller 400 has specified in the read table 370 of memory 360 that the node apparatus 300 shall receive data form slots 2, 3, 5, and 6 (marked X in the array). The slot 3 is to be used for the receiving of said validity bit pattern. It has also stated in the address table that the information received in slot 3 shall be used by, or be addressed to the processor 330.

In FIG. 11, at the begining of a frame, the processor 330 will receive the bit pattern (0000010. . . ) of slot 3 described above and write this bit pattern into the validity table 385. Hence, given the situation described above, the sixth entry of the validity table 385 will contain a one (1) designating non-valid data.

When receiving data 405 associated with one of the time slots 4 or 5 marked X in the read array 370, the validity table 385 will determine whether or not the read data is valid. Consequently, when data 405 is read from the fifth time slot, the processor 330 will find no entry in the corresponding element of the validity table 385 and hence accepted the data as valid data. The corresponding element of the address table 380 is then accessed for the provision of information as to the end user for which the data 405 is intended. Since the data 405 was read out from slot 5, the address table 380 will state that the data shall be sent to the end user 32, and hence the user interface 350 will send a data packet 410 comprising the data 405 and an end user identification (user32) to the end user 32. However, when data 405 is read from the sixth time slot, the processor 330 will find a one (1) in the corresponding entry of the validity array 385 and hence discard the data 405 as being non-valid.

As is understood, the feature described with reference to the sending and receiving nodes in FIGS. 8 and 9, as well as the features described with reference to the sending and receiving nodes in FIGS. 10 and 11, may be combined into a node having both sending and receiving capabilities. For example, such a unit may comprise a synchronization detector, a network interface, a counter, a processor, a user interface and a node controller of the kind described above but used in relation to both a sending and a receiving mode.

It is also understood that the different parts and components described with reference to the sending and receiving nodes in FIGS. 8, 9, 10, and 11 may be combined into one or more integrated units. For example, the processor, the node controller and the memory may be combined into one single node-corresponding unit.

Figure 12:
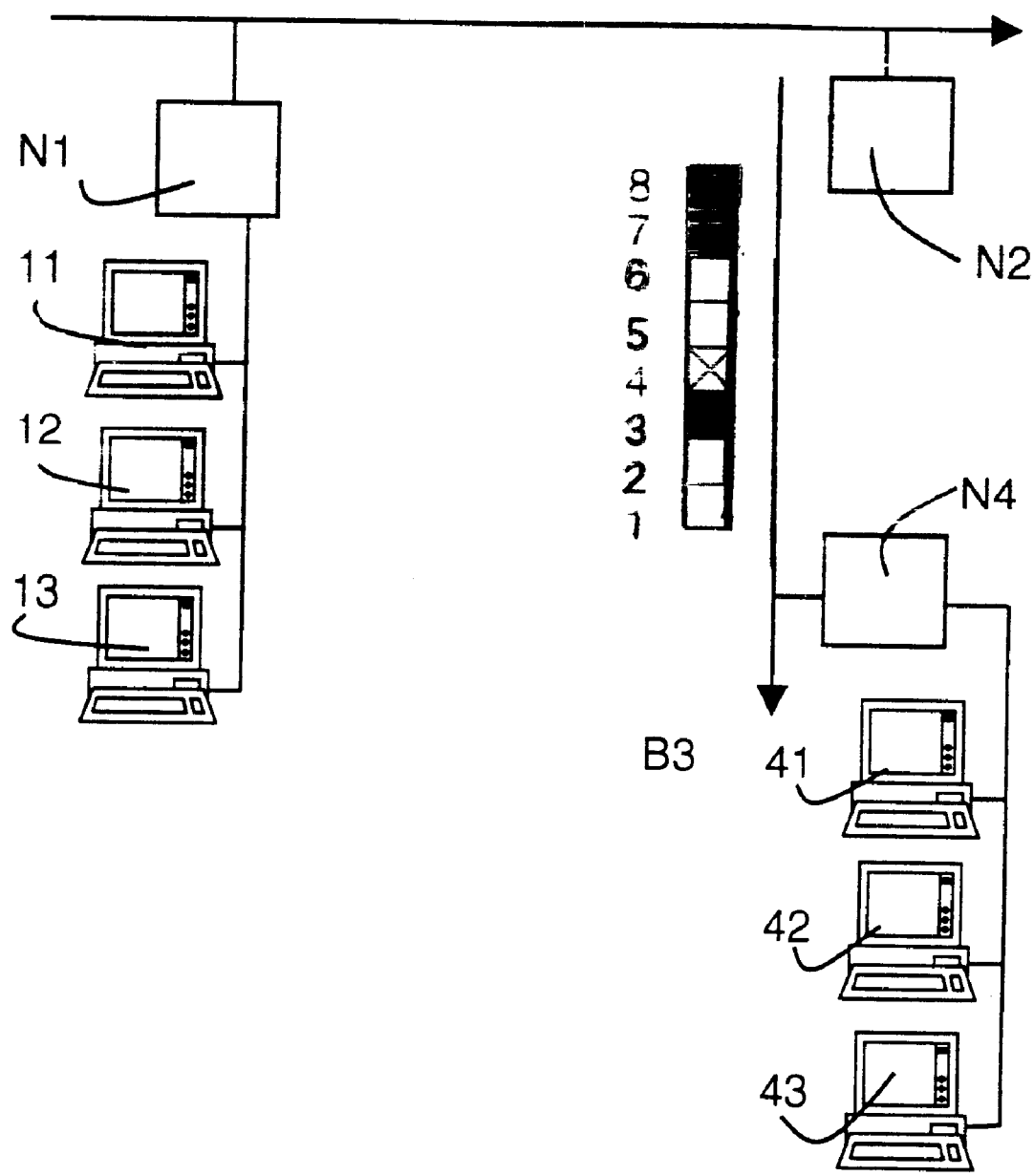
FIG. 12 schematically switching of a channel according to an embodiment of the invention.

Switching of an isochronous channel according to an embodiment of the invention will now be described with reference to FIG. 12, schematically showing a simplified view of a DTM network comprising three nodes N1, N2, and N3 and two bitstreams B1 and B3. Node N1 provides end users 11, 12, and 13 with access to the bitstreams B1, node N2 provides switching between bitstreams B1 and and B3, and node N4 provides end users 41, 42, and 43 with access to bitstream B3.

In FIG. 12, it is assumed that the end user 11 has requested a channel to the end user 41 and that an isochronous channel has been established as a result thereof from node N1 on bitstream B1 to node N4 on bitstream B3 via the intermediate node N2, wherein the intermediate node provides time slots mapping of the channel between bitstream B1 and bitstream B3. As schematically illustrated in FIG. 12, the channel is defined to comprise the first four time slots within each frame of bitstream B1 and the third, fourth, seventh and eighth time slot within each frame on bitstream B3. Consequently, the intermediate node is arranged to map the content of the first, second, third and fourth time slot on bitstream B1 into the third, fourth, seventh and eighth time slot, respectively, on bitstream B3.

At the point in time illustrated in FIG. 12, it is assumed that the sending end user 11 only has provided node N1 with valid data for the first, third, and fourth time slot of the illustrated frame (as indicated by black filled squares), but has failed to provide valid data for the second time slot of illustrated frame. As a result thereof, and according to an embodiment of the invention, node N1 has transmitted an idle data block into the second time slot on bitstream B1, thus marking it as containing non-valid data.

In the embodiment of FIG. 12, the intermediate node N2, while not being the actual receiving node of the channel, will map the content of the second time slot on bitstream B1 into the fourth time slot on bitstream B4 irrespective of whether or not it contains valid or non-valid data. Consequently, the idle data block read from the second time slot on bitstream B1 will be mapped into the fourth time slot on bitstream B3, marking said fourth time slot as containing non-valid data.

As a result, node N4 will detect that the fourth time slot of the current frame contains non-valid data and will therefore only forward data contained in slot three, seven and eight on bitstream B3 to the receiving end user 41.

Even though the invention has been discussed and described in detail above, and with reference to exemplifying embodiments thereof, it is understood that it is not limited thereto and that different modifications, combinations and alterations thereof may be made within the scope of the invention, which is defined by the accompanying claims.

What is claimed is:

1. A method for transferring data on a bitstream in a circuit switched time division multiplexed network, wherein said bitstream is divided into frames, each frame is divided into time slots, and said time slots are divided into control slots and data slots, and wherein an isochronous channel, comprising one or more data slots within each cycle of said bitstream, has been established between a first node and a second node of said network, said method comprising the step of:

providing said bitstream with data distinguishing each data slot, within said channel, that contains non-valid data as a result of said first node not being able to transmit valid data into said each data slot, which step in turn comprises the steps of:

providing said each data slot with data designating the respective data slot as containing non-valid data;

encoding said designating data of each respective data slot as a specific bit pattern; and transmitting said specific bit pattern on said bitstream, said specific bit pattern, when received, being recognizable as identifying a data slot which contains non-valid data.

2. A method as claimed in claim 1, comprising detecting said specific bit pattern identifying said each data slot that contain non-valid data and, based thereupon, determining how or if to forward data provided in said each data slot.

3. A method as claimed in claim 1, wherein each data slot contains N bits of data, and wherein said step of encoding comprises the step of:

encoding said N bits contained in said each data slot into M bits, where M>N.

4. A method as claimed in claim 3, wherein N=64 and M=80.

5. A method as claimed in claim 1, wherein said step of providing said bitstream with data distinguishing each data slot, within said channel, that contains non-valid data further comprises the steps of:

encoding the data of each slot containing valid data as a respective bit pattern; and transmitting said respective bit pattern on said bitstream, said respective bit pattern, when received, being recognizable as identifying a data slot which contains valid data.

6. A method as claimed in claim 1, wherein said step of providing said bitstream with data distinguishing each data slot, within said channel, that contains non-valid data comprises the steps of:

providing said bitstream with data designating all data slots within said channel as containing non-valid data; and invalidating said data designating all data slots within said channel as containing non-valid data by providing said bitstream with data designating one or more data slots within said channel as providing valid data when writing valid data into said one or more data slots.

7. A method as claimed in claim 1, wherein said step of providing said bitstream with data distinguishing each data slot, within said channel, that contains non-valid data comprises the steps of:

providing each data slot within said channel with data designating the respective data slot as containing non-valid data; and deleting said data designating a respective data slot as containing non-valid data by writing valid data into said data slot.

8. A system for transferring data on a bitstream in a circuit switched time division multiplexed network, wherein said bitstream is divided into frames, each frame is divided into time slots, and said time slots are divided into control slots and data slots, comprising:

a first node for transmitting data into time slots of said bitstream;

a second node for reading data from time slots of said bitstream;

means for establishing an isochronous channel, comprising one or more data slots within each cycle on said bitstream, between said first node and said second node; and means for providing said bitstream with data distinguishing each data slot, within said channel, that contains non-valid data as a result of said first node not being able to transmit valid data into said each data slot, said means comprising:

means for providing said each data slot with data designating the respective data slot as containing non-valid data;

means for encoding said designating data of each respective data slot as a specific bit pattern; and means for transmitting said specific bit pattern on said bitstream, said specific bit pattern, when received, being recognizable as identifying a data slot which contains non-valid data.

9. A system as claimed in claim 8, wherein said second node comprises means for detecting said data distinguishing said each data slot that contain non-valid data and, based thereupon, determining how or if to forward data provided in said each slot.

10. A system as claimed in claim 8, wherein said second node is arranged to switch said channel from said a bitstream to another bitstream, said second node comprising means for forwarding said data distinguishing each data slot that contain non-valid data from said a bitstream to said another bitstream accordingly.

11. A system as claimed in claim 8, said first node comprising means for detecting that said first node has not received valid data for transmission into a data slot of said channel and for controlling the transmission of data distinguishing said a data slot as transferring non-valid data based thereupon.

12. A system as claimed in claim 8, said network comprising a third node arranged upstream in relation to said first node, said third node being arranged to provide said bitstream with data designating all data slots within said channel as containing non-valid data, and said first node comprising means for invalidating said data designating all data slots within said channel as containing non-valid data by providing said bitstream with data designating one or more data slots within said channel as providing valid data when writing valid data into said one or more data slots.

13. A system as claimed in claim 8, wherein said control slots are used for control signaling between nodes of the network and wherein said data slots are used for transfer of user data.

14. An apparatus for transmitting information on a bitstream of a circuit switched time division multiplexed network, wherein said bitstream is divided into frames, each frame is divided into time slots, and said time slots are divided into control slots and data slots, said apparatus comprising:

means for establishing an isochronous channel, comprising one or more data slots within each cycle on said bitstream, to a receiving unit having access to said bitstream;

means for receiving data to be transmitted into data of said channel;

means for writing received data into said data slots of said channel; and means for providing said bitstream with data distinguishing each data slot, within said channel, that contains non-valid data as a result of said first node not being able to transmit valid data into said each data slot, said means comprising:

means for providing said each data slot with data designating the respective data slot as containing non-valid data;

means for encoding said designating data of each respective data slot as a specific bit pattern; and means for transmitting said specific bit pattern on said bitstream, said specific bit pattern, when received, being recognizable as identifying a data slot which contains non-valid data.

15. Apparatus for reading information from a bitstream of a circuit switched time division multiplexed network, wherein said bitstream is divided into frames, each frame is divided into times slots, and said time slots are divided into control slots and data slots, and wherein said apparatus have been arranged to read data from data slots of an isochronous channel defined by one or more data slots within each cycle on said bitstream, said apparatus comprising:

means for reading data from said data slots of said channel; and means for detecting data distinguishing each data slot on said bitstream, within said channel, that is not transferring valid data and for, based thereupon, determining how or if to forward data provided in said each data slot.

16. Apparatus as claimed in claim 15, wherein said means for detecting data distinguishing said each data slot, within said channel, that is not transferring valid data are arranged to read each one of said one or more data slots within said channel to detect whether or not each respective data slot thereof contains data indicating that it contains non-valid data.

17. Apparatus as claimed in claim 15, wherein said means for detecting data distinguishing said each data slot, within said channel, that is not transferring valid data are arranged to read a control slot on said bitstream to detect whether or not said control slot contains data distinguishing one or more data slots within said channel as containing non-valid data.

* * * * *